United States Patent
Putilin

(10) Patent No.: US 6,717,728 B2
(45) Date of Patent: Apr. 6, 2004

(54) SYSTEM AND METHOD FOR VISUALIZATION OF STEREO AND MULTI ASPECT IMAGES

(75) Inventor: Andrey N. Putilin, Moscow (RU)

(73) Assignee: NeurOK LLC, McLean, VA (US)

( * ) Notice: Subject to any disclaimer, the term of this patent is extended or adjusted under 35 U.S.C. 154(b) by 0 days.

(21) Appl. No.: 09/977,462

(22) Filed: Oct. 15, 2001

(65) Prior Publication Data

US 2002/0036648 A1 Mar. 28, 2002

Related U.S. Application Data

(63) Continuation-in-part of application No. 09/456,826, filed on Dec. 8, 1999, now abandoned.

(51) Int. Cl.[7] .................. G02B 27/22; G03B 21/56; G03B 21/00; G03B 21/26

(52) U.S. Cl. .............. 359/462; 359/443; 359/449; 359/460; 353/7; 353/30

(58) Field of Search .................. 359/443, 462, 359/476, 449, 460; 353/7, 30

(56) References Cited

U.S. PATENT DOCUMENTS

| | | | |
|---|---|---|---|
| 3,915,548 A | 10/1975 | Opittek et al. ............. 350/3.5 |
| 3,975,081 A | 8/1976 | Kato et al. ................. 350/3.5 |
| 4,717,949 A | 1/1988 | Eichenlaub ................. 358/3 |
| 4,989,954 A | 2/1991 | Yokoyama et al. ......... 350/337 |
| 5,134,516 A | 7/1992 | Lehureau et al. ........... 359/301 |
| 5,200,844 A | 4/1993 | Suvada ...................... 359/40 |
| 5,317,507 A | 5/1994 | Gallant .................. 364/419.13 |
| 5,379,133 A | 1/1995 | Kirk ........................... 359/15 |
| 5,420,718 A | 5/1995 | Davies et al. |
| 5,457,574 A * | 10/1995 | Eichenlaub ................ 359/619 |
| 5,497,189 A | 3/1996 | Aritake et al. ............. 348/51 |
| 5,523,886 A * | 6/1996 | Johnson-Williams et al. ......................... 359/464 |
| 5,552,840 A | 9/1996 | Ishii et al. |
| 5,589,956 A | 12/1996 | Morishima et al. ......... 359/15 |
| 5,619,709 A | 4/1997 | Caid et al. .................. 395/794 |
| 5,640,171 A * | 6/1997 | Shimada .................... 345/8 |
| 5,712,732 A | 1/1998 | Street |
| 5,745,197 A | 4/1998 | Leung et al. ............... 349/77 |
| 5,764,317 A | 6/1998 | Sadovnik et al. ........... 349/5 |
| 5,790,284 A | 8/1998 | Taniguchi et al. .......... 358/15 |
| 5,794,178 A | 8/1998 | Caid et al. .................. 704/9 |
| 5,805,244 A | 9/1998 | Suh ............................ 349/7 |
| 5,812,186 A | 9/1998 | Telfer et al. ............... 348/54 |

(List continued on next page.)

FOREIGN PATENT DOCUMENTS

| | | |
|---|---|---|
| RU | 2080978 | 8/1987 |
| RU | 2116704 | 4/1998 |
| RU | 2103687 | 7/1998 |

OTHER PUBLICATIONS

Lancaster, F. Wilfrid; Information Retrieval Systems, Characteristics, Testing, and Evaluation.

*Primary Examiner*—Russell Adams
*Assistant Examiner*—Magda Cruz
(74) *Attorney, Agent, or Firm*—Hogan & Hartson

(57) ABSTRACT

The method and system of the present invention displays autostereographic images without parallax barriers or loss of resolution. A stereopair is processed and sent to a distant display and one or more transmissive displays placed in front of it. Each display has a calculated images containing at least some of the image information destined for both eyes of a viewer. Each display acts as a mask for the other displays. The processing of the stereopairs to produce calculated images comprises summing the predicted image data, comparing the predicted image data to the desired stereopair, and minimizing the error. In a preferred embodiment, this processing is performed by an artificial neural network. A spatial mask, such as a diffuser, can be placed between displays to suppress Moiré patterns.

20 Claims, 3 Drawing Sheets

U.S. PATENT DOCUMENTS

| | | | |
|---|---|---|---|
| 5,812,223 A | 9/1998 | Noguchi | 349/9 |
| 5,822,117 A * | 10/1998 | Kleinberger et al. | 359/465 |
| 5,838,494 A | 11/1998 | Araki | |
| 5,872,590 A * | 2/1999 | Aritake et al. | 348/57 |
| 5,883,606 A | 3/1999 | Smoot | 345/7 |
| 5,903,388 A | 5/1999 | Sedlmayr | 359/497 |
| 5,912,650 A | 6/1999 | Carollo | 345/7 |
| 5,930,037 A * | 7/1999 | Imai | 359/463 |
| 5,945,965 A * | 8/1999 | Inoguchi et al. | 345/6 |
| 5,976,017 A * | 11/1999 | Omori et al. | 463/32 |
| 6,023,253 A | 2/2000 | Taniguchi et al. | 345/7 |
| 6,134,532 A | 10/2000 | Lazarus et al. | 705/14 |
| 6,173,275 B1 | 1/2001 | Caid et al. | 706/14 |
| 6,252,707 B1 * | 6/2001 | Kleinberger et al. | 359/465 |
| 6,289,353 B1 | 9/2001 | Hazlehurst et al. | 707/102 |
| 6,442,465 B2 * | 8/2002 | Breed et al. | 701/45 |
| 6,603,442 B1 * | 8/2003 | Hong | 345/7 |

* cited by examiner

SYSTEM AND METHOD FOR VISUALIZATION OF STEREO AND MULTI ASPECT IMAGES

RELATIONSHIP TO PRIOR APPLICATIONS

This Application is a Continuation-in-part of U.S. application Ser. No. 09/456,826, filed Dec. 8, 1999, now abandoned which is incorporated herein by reference in its entirety.

FIELD OF THE INVENTION

This invention relates generally to a stereoscopic display of images and related apparatus. More specifically the present invention is a system and method for 3-D visualization based on parallel information processing of stereo imaging on multi aspect displays.

BACKGROUND OF THE INVENTION

Stereoscopic display of images has become increasingly important in modern times. For example, training of professionals, from pilots to physicians, now frequently relies upon the visualization of stereographic images. Further it is important that multiple aspects of an image be able to be viewed so that, for example, during simulations of examination of human or mechanical parts, a viewer can have a continuous stereoscopic view of those parts without having to change data or switch images.

Conventional stereoscopic display systems have been in use for many years. All of these rely upon segregating images for the right and left eyes. For example, an apparatus which sequentially displays different views to the left and right eye of a viewer has been used successfully in cartographic and other applications. In this instance, using stereo image alternation, a different view is sequentially presented to the left and right eye of the viewer. This is also accomplished by using cathode ray tubes or liquid crystal displays whereby a viewer wears special glasses such as polarizing glasses or liquid crystal shutter glasses in order to see a different image in the left and right eye.

Lenticular lenses have also been used to allow a viewer to see a left and right image separately when a viewer is at an optimum distance from the lenticular lens screen. For example U.S. Pat. No. 5,838,494 to Araki was issued for an "Apparatus for Displaying Image Allowing Observer to Recognize Stereoscopic Image." This apparatus uses a lenticular screen displaying a plurality of striped images each stripe corresponding to the parallax view of the left and right eye when the user is looking through the lenticular screen. This apparatus presents a limited number views of a stereo image pair and is therefore limited in the number of views that can be displayed.

U.S. Pat. No. 5,930,037 was issued to Imai for a "Stereoscopic Display Apparatus Which Prevents Inverse Stereoscopic Vision." This invention relates to the use of lenticular lenses to see stereoscopic image but also prevents the phenomenon known as inverse stereoscopic viewing when the right eye sees the image that is destined for the left eye and vice versa. While this does prevent a certain phenomena from occurring, this invention is limited in the number of stereoscopic image pairs that can be present to a particular user.

U.S. Pat. No. 5,712,732 was issued to Street for an "Auto Stereoscopic Image Display Adjustable for Observer Location and Distance." This invention was created to account for the fact that, when a lenticular lens is used, a viewer must be at a particular distance from the lens in order for the lens to operate correctly. This invention comprises a distance measuring apparatus allowing a system to determine the position of the viewer's head in terms of distance and position (left-right) relative to the screen. In this fashion an appropriate stereographic image pair can be presented to the user at any particular location. Again this invention relies upon a lenticular screen to separate the parallax views for the left and right eye of the viewer. The head location apparatus dictates various other geometries associated with viewing the stereographic pairs of an image. However, this invention relates to adapting for the location of the viewer's head during such viewing and is limited in the number of aspects of images that can be created.

What would be desirable is a system that provides numerous aspects or "multi aspect" display such that the user can see many aspects of a particular object when desired. It would further be useful for such viewing to take place in a flexible way so that the viewer is not constrained in terms of the location of the viewer's head when seeing the stereo image.

BRIEF SUMMARY OF THE INVENTION

It is therefore an objective of the present invention to provide for multi aspect image viewing to create a stereo image.

It is a further objective of the present invention to be able to present an unlimited number of aspects of an image to a viewer so as not to lose any information while simultaneously having a full stereo image presented to the viewer.

It is yet another objective of the present invention to simplify the three-dimensional (3-D) visualization of objects.

It is a further objective of the present invention to improve the perception of 3-D information to a viewer.

It is a further objective of the present invention to remove sources of error from the viewing of stereographic images.

It is yet another objective of the present invention to eliminate any mask or obstruction from the view of a viewer when reviewing stereo imagery.

It is yet another objective of the present invention to eliminate the parallax barrier from the view of viewers trying to visualize a three dimensional scene.

In conventional parallax barrier-type of lenticular lenses, very few aspects of a particular object are presented. Further, one screen, or plane, contains all of the information about the various aspects while the other screen (or mask) contains only the lenticular lens or running slit that isolates the left aspect from the right aspect of an image being viewed. Further, whenever a viewer uses a parallax barrier type of viewing system, the viewer is actually seeing the parallax barrier or the lenticular lens. This further limits the number of aspects of an image that can be seen by a viewer in attempting to view stereographic images.

The present invention is a system and method for three-dimensional visualization based upon parallel information processing of stereo and multi aspect images. The images can be processed for a single 3-D viewing zone or multiple 3-D viewing zones. Further, in another embodiment, the processing can be adaptive in nature so as to be continually processed as the location of the viewer changes. Thus the perception of 3-D images by the viewer is improved by not constraining the viewer in any meaningful way.

In the present invention, at least two transmissive electronic display screens are positioned one behind another.

Each such screen is composed of multiple pixels or cells that collectively are capable of forming an image. Although the transmissive electronic display screens will be referred to hereinafter as LCDs (liquid crystal displays), the present invention is not meant to be limited to LCDs and can use other transmissive electronic display means, such as, but not limited to, plasma displays, OLED (organic light emitting diode) or OLEP (organic light emitting polymer) screens. The screens are transmissive, i.e. they each transmit light. An illumination means is positioned behind the screens to illuminate the LCD images created.

Unlike prior art systems that use a pair of screens to display a right and left stereographic image pair or aspect (hereafter called stereopair), each screen of the present invention displays a calculated image that is not one of the stereopair images, but is rather a derivitive of the stereopair images that interact in the present design to produce the stereo image to be viewed. The information is derived from the database of stereopairs stored in a memory unit. A memory unit provides a desired stereopair to the processing block, which in turn processes the calculated images to be displayed by the LCD panels. Further, the processing block can control the lighting unit that illuminates the LCD panels.

Since the 3-D image information is distributed between the LCD panels, there is no loss of resolution as found in prior art systems wherein both aspects must be displayed on a single screen or plane, such as with lenticular viewing systems.

In another embodiment of the invention, the calculated images are presented to the viewer based upon a sensing of the viewer position. This viewer position signal is input to the processing block by means known in the art, such as IR sensing of position or RF or ultrasonic tracking means, which in turn retrieves a different stereopair from the memory unit for subsequent processing, presentation, and display by the controller of the LCD panels.

In a basic embodiment of the invention, the calculated image in each panel acts as a mask for the other panel(s). Thus, the viewer sees no images other than the object itself. This in contrast to conventional parallax barrier-type imaging systems, where the mask can clearly be seen. In addition, this preliminary processing of the image results in the absence of noise and distortion of a visual nature such as that created by lenticular screens or lenses.

In another embodiment of the invention, a separate mask panel can be included between the LCD panels so as to increase the image quality and suppress Moiré patterns.

DETAILED DESCRIPTION OF THE INVENTION

As noted above, the present invention is a system and method for presentation of multiple aspects of an image to create a three dimensional viewing experience using two liquid crystal panels.

Figure 1:
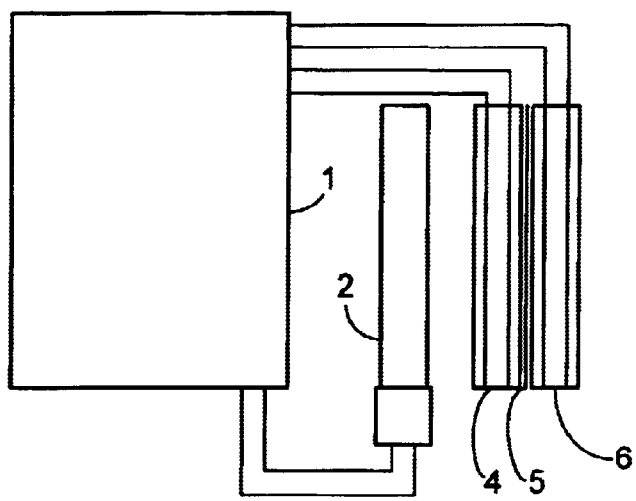
FIG. 1 illustrates the display system.

Referring to FIG. 1, computational device 1 provides control for an illumination subsystem 2 and for the display of images on two discreet liquid crystal displays 4 and 6 separated by a spatial mask 5. Illumination source 2 which is controlled by the computational device 1 illuminates the transmissive liquid crystal displays 4 and 6 which are displaying images provided to them by the computational device 1.

Figure 2:
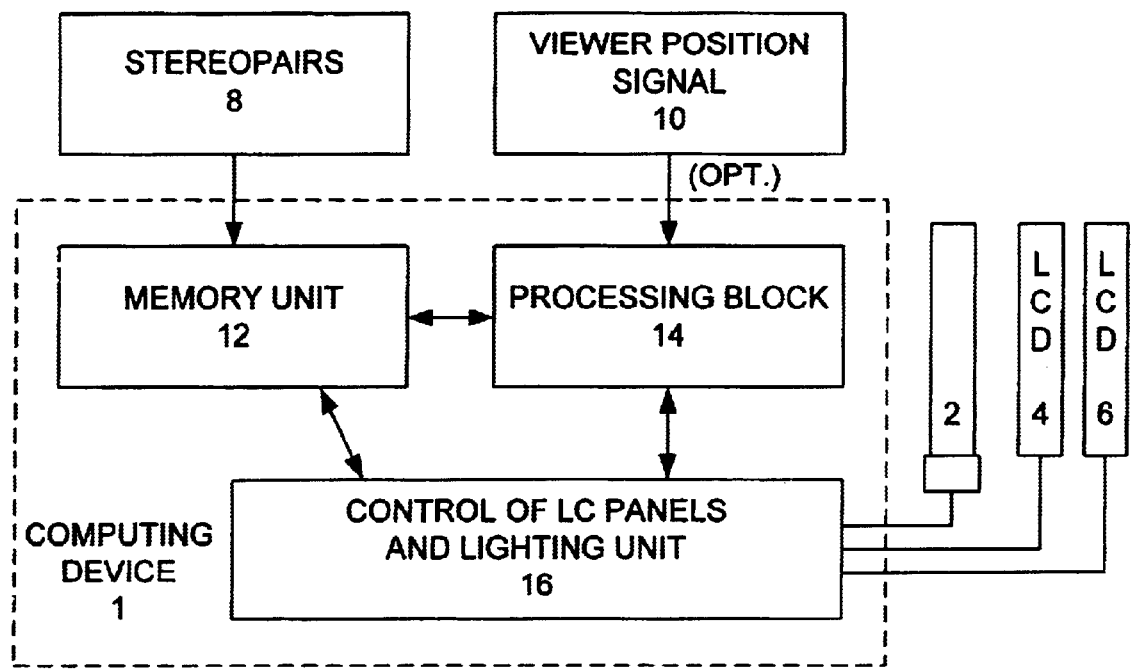
FIG. 2 illustrates the computational and control architecture of the present invention.

FIG. 2 illustrates the detail for the computational device 1. Although disclosed in this embodiment as including a viewer position signal 10, it is understood by one of skill in the art that the invention can also be practiced without this feature by defining a set viewing zone or multiple set viewing zones, as discussed in the example below. The invention comprises a database of stereopairs or aspects 8 which are provided to the memory unit 12. Memory unit 12 has several functions. Initially memory unit 12 will extract and store a particular stereopair from the stereopair database 8. This stereopair will correspond to an initial viewing position. As noted above, a viewer position sensor 10 can provide a viewer position signal to processing block 14.

All during the viewing session, the viewer position signal 10 is constantly monitored and provided to processing block 14. Depending upon the viewer position and subsequent error processing as noted (below), information from processing block 14 regarding viewer position 10 is provided to memory unit 12 for subsequent extraction of the stereopair aspects from the data base 8. Thus the present invention can constantly provide an updated series of stereopairs to the processing block based upon the viewer position signal 10 if the viewer desires to see the 3-D object from various positions. If the viewer desires to see a single 3-D view of an object, regardless of the viewing position, the viewer position signal 10 can be used to determine the optical geometry used in the required processing.

Memory unit 12 provides the desired stereopair to the processing block 14 to produce calculated images. The calculated images can be directly sent from processing block 14 to LCD panel and lighting unit control 16 or stored in memory unit 12 to be accessed by control unit 16. Unit 16 then provides the calculated images to the appropriate LCD panels 4, 6 as well as controls the lighting that illuminates the transmissive LCD panels 4, 6. Processing block 14 can also provide instructions to LCD and lighting control unit 16 to provide the appropriate illumination.

It should be noted that memory unit 12 holds the accumulated signals of individual cells or elements of the liquid crystal display. Thus the memory unit 12 and processing block 14 have the ability to accumulate and analyze the light that is traveling through relevant screen elements of the LCD panels toward the right and left eyes of the viewer which are identified by the processing block 14 based upon the set viewing zone(s) or the viewer position signal 10.

Figure 3:
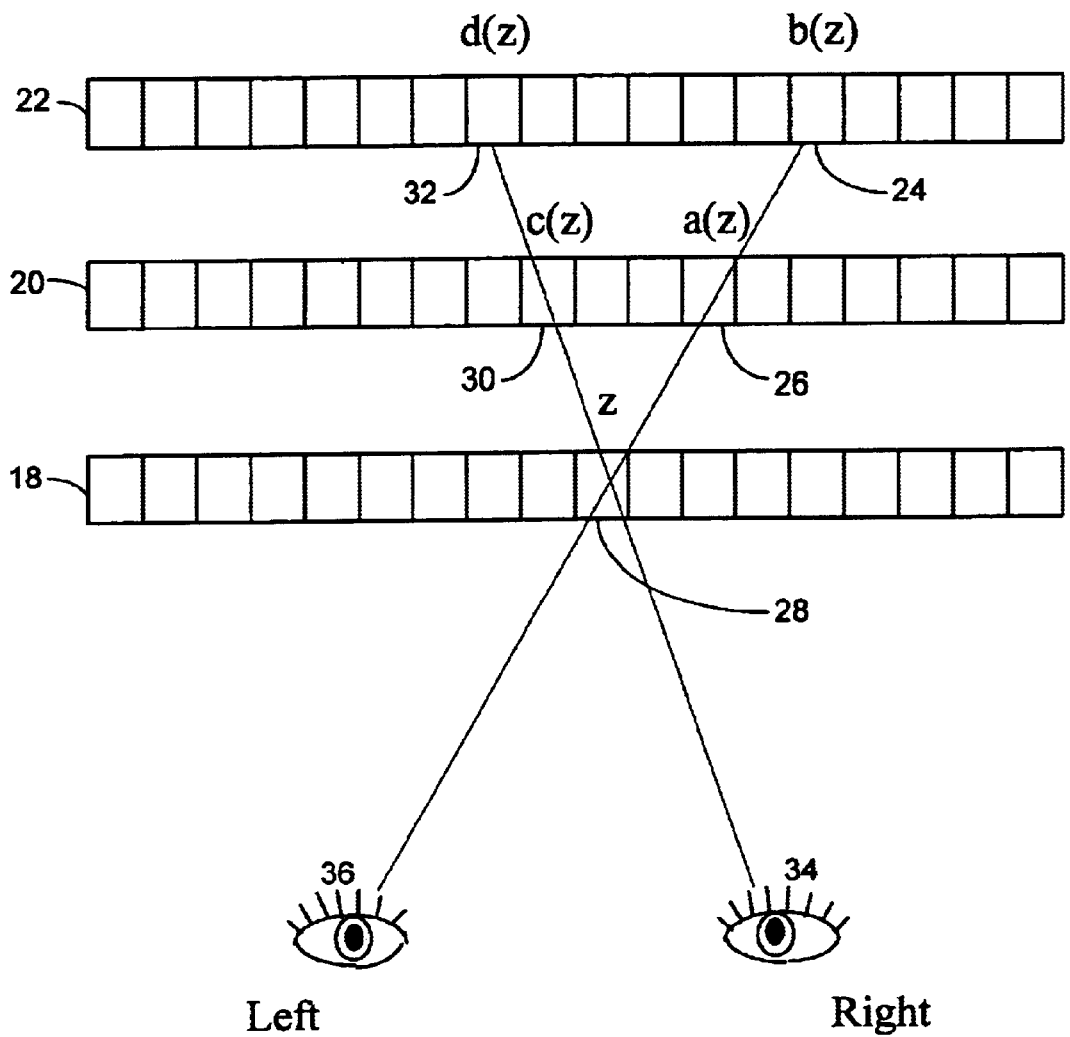
FIG. 3 illustrates the light beam movement of the present invention.

Referring to FIG. 3, the diagram of the light beam movement of the present invention is illustrated. In this illustration a three-panel LCD system is illustrated. In this instance the display comprises an image presented on a near panel 18, a mask panel 20 and a distant image panel 22. The relative position of these panels is known and input to the processing block for subsequent display of images. Although illustrated as an LCD panel that is capable of storing image information, mask panel 20 could also be a simpler spatial mask device, such as a diffuser.

Different portions of the information needed to present each stereopair to a viewer are displayed in each element of panels 18, 20, and 22 by sending appropriate calculated images to each panel. In this illustration left eye 36 sees a portion 28 on panel 18 of the calculated image sent to that panel. Since the panels are transmissive in nature, left eye 36 also sees a portion 26 of the calculated image displayed on the mask LCD panel 20. Additionally, and again due to the transmissivity of each LCD panel, left eye 36 also sees a portion 24 of the calculated image which is displayed on a distant LCD panel 22. In this manner, desired portions of the calculated images are those that are seen by the left eye of the viewer Similarly, right eye 34 sees the same portion 28 of the calculated image on the near panel 18, as well as sees a portion 30 of the calculated image displayed on the mask panel 20, as well as a portion 32 of the calculated image on distant panel 22. These portions of the calculated images are those that are to be seen by the right eye of the viewer.

These portions of the calculated images seen by the right and left eye of the viewer constitute two views seen by the viewer, thereby creating a stereo image.

Figure 4:
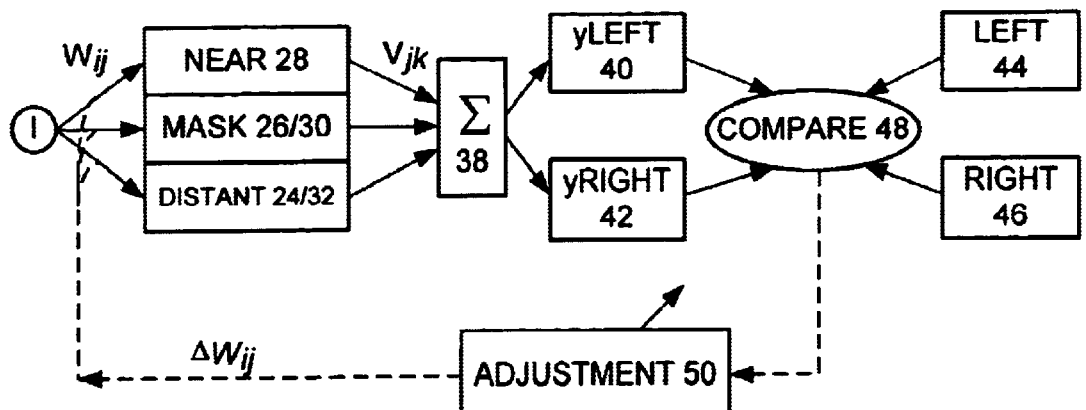
FIG. 4 illustrates the data flow for the operation of the display control program.

Referring to FIG. 4, the data flow for the manipulation of the images of the present invention is illustrated. As noted earlier the memory unit 12, processing block 14, and LCD control and luminous control 16 regulate the luminous radiation emanating from the distant screen 22 and the transmissivity of the mask 20 and near screen 18.

Information concerning multiple discreet two dimensional (2-D) images (i.e., multiple calculated images) of an object, each of which is depicted in multiple different areas on the LCD screens, and, optionally, information about positions of the right and left eyes of the viewer are adjusted by the processor block 14.

Signals corresponding to the transmission of a portion 28 of near screen 18, the transmissivity of mask 20 corresponding to the left and right eye respectively (26, 30) and the distant screen 22 corresponding to the luminous radiation of those portions of the image of the left and right eye respectively (24, 32) are input to the processing block following the set program.

The light signals from the cells of all screens that are directed toward the right and left eye of each viewer are then identified. In this example signals from cell 28, 26, and 24, are all directed toward the left eye of the viewer 36 and signals from block 28, 30, and 32 are directed the right eye of the viewer 34.

Each of these left and right eye signals is summed 38 to create a value for the right eye 42 and the left eye 40. These signals are then compared in a compare operation 48 to the relevant parts of the image of each aspect and to the relevant areas of the image of the object aspects 44 and 46.

Keeping in mind that the signal is importantly a function of the location of the viewer's eyes, the detected signal can vary to some extent. Any errors from the comparison are identified for each cell of each near mask, and distant screen. Each error is then compared to the set threshold signal and, if the error signal exceeds the set threshold signal, the processing block control changes the signals corresponding to the luminous radiation of at least part of the distant screen 22 cells as well changes the transmissivity of at least part of the mask and near cells of the LCD displays.

If the information concerning the calculated images of the object changes, as a result of movement of the viewer position, the processing block senses that movement and inputs into the memory unit signals corresponding to luminous radiation of the distant screen cells as well as the transmissivity of the mask and near screen cells until the information is modified. When the viewer position varies far enough to require a new view, that view or image is extracted from the database and processed.

EXAMPLES

In a simple embodiment, the present invention consists of two transmissive LCD screens, such as illustrated in FIG. 1. The distant and nearest (hereinafter called near) screens 4 and 6 are separated by a gap in which a spatial mask 5 is placed. This mask may be pure phase (e.g., lenticular or random screen), amplitude or complex transparency. The screens are controlled by the computer 1. The viewing image formed by this system depends upon the displacement of the viewer's eyes to form an autostereographic 3-D image. The only problem that must be solved is the calculation of the images (i.e., calculated images) on the distant and near screens for integrating stereo images in the viewer eyes.

One means to solve this problem is to assume that L and R are a left and right pair of stereo images and a viewing-zone for the viewer's eye positions is constant. A spatial mask of an amplitude-type will be assumed for simplicity.

As illustrated in FIG. 3, two light beams will come through the arbitrary cell z 28 on the near screen 18 in order to come through the pupils of eyes 34 and 36. These beams will cross mask 20 and distant screen 22 at the points a(z) 26 and c(z) 30, b(z) 24 and d(z) 32, respectively. The image in the left eye 36 is a summation of:

$$SL_z = N_z + M_{a(z)} + D_{d(z)}, \quad (1)$$

where N is the intensity of the pixel on the near screen 18, M is the intensity of the pixel on the mask 20, and D is the intensity of the pixel on the distant screen 22.

For right eye 34, respectively, the summation is:

$$SR_z = N_z + M_{c(z)} + D_{d(z)}. \quad (2)$$

When light is directed through all the pixels z(n) of near screen 18, the images SL and SR are formed on the retinas of the viewer. The aim of the calculation is a optimizing of the calculated images on the near and distant screens 18 and 22 to obtain $$SL \to L, \ SR \to R.$$

One can prove that it is impossible to obtain an exact solution for the arbitrary L and R images. That is why the present invention seeks to find an approximated solution in the possible distributions for N and D to produce a minimum quadratic disparity function (between target and calculated images):

$$\rho(SL-L)\overrightarrow{N,D}\min$$

$$\rho(SR-R)\overrightarrow{N,D}\min$$

where $\rho(x)$ is a function of the disparity, with the limitation of pixel intensity to $0 \leq N \leq 255$, $0 \leq D < 255$ for constant M.

An artificial Neural Network (NN) was used for this problem solving because of the following specific features:
Parallel processing; and
Possibility of DSP integrated scheme application.

Figure 5:
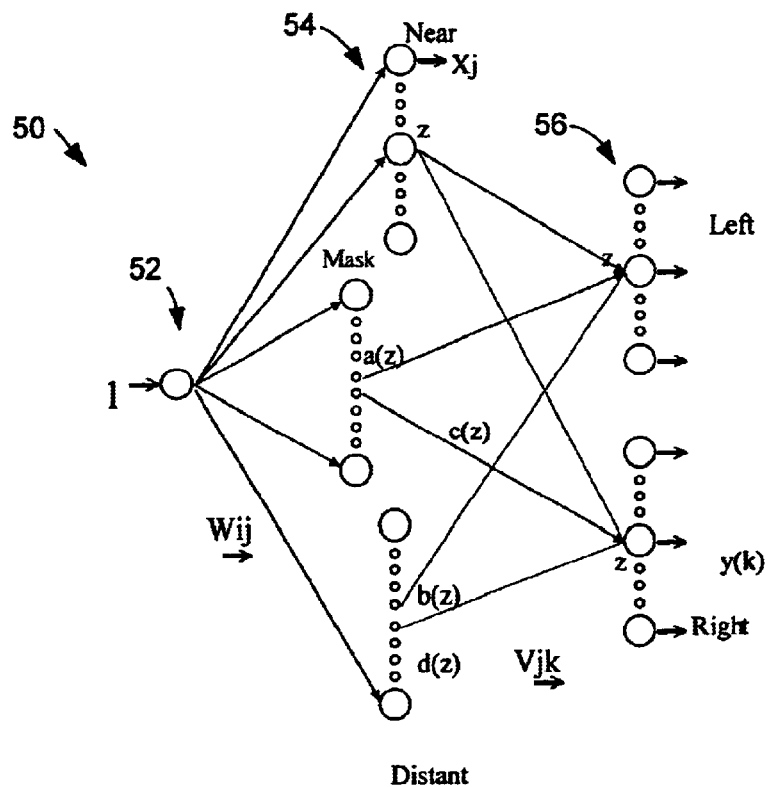
FIG. 5 illustrates a neural network diagram used to determine image data.

The neural network architecture of FIG. 5 was applied to the present problem. 50 is a three layer NN. The input layer 52 consists of one neuron that spreads the unit excitement to the neurons of the hidden layer 54. The neurons of the hidden layer 54 form three groups that correspond to the near and distant screens and the mask. The neurons of the output layer 56 forms two groups that correspond to images SL and SR. The number of neurons corresponds to the number of LCD screens pixels. Synaptic weights Wij that corresponds to the near and distant screens is an adjusting parameter, and Wij of the mask is a constant. Synaptic interconnection between hidden layer neurons corresponds to the optical scheme of the system:

$$V_{j,k} = \begin{cases} 1 & -\text{if } j = k \,\&\, k,\, a(k),\, b(k) \text{ is on the same line} \\ & \text{or } j = k \,\&\, k,\, c(z),\, d(z) \text{ is on the same line} \\ 0 & -\text{otherwise} \end{cases} \quad (4)$$

Nonlinear functions are a sigmoid function in the value [0–255]:

$$F(x) = \frac{255}{1 + \exp(-x)}. \quad (5)$$

The functioning of the NN can be described by:

$$X_J = F\left(\sum_J W_{ij} Inp_i\right) = \quad (6)$$

$$F(W_{1,J}) = \begin{cases} D_J & - \text{ if } j \in D \\ M_J & - \text{ if } j \in M \\ N_J & - \text{ if } j \in N \end{cases} - \text{ output of hidden layer}$$

$$Y_k = F\left(\sum_k V_{jk} X_J\right) \quad - \text{ output of the } NN. \quad (7)$$

The output signal in any neuron is a summation of at least one signal from the distant and near screens and the mask. The output of the NN (according to (6),(7)), corresponding to the left and right eye of the viewer, is $$Y_k(\text{left}) = F(X_z + X_{a(z)} + X_{b(z)}) = F(N_z + M_{a(z)} + D_{b(z)})$$

$$Y_k(\text{right}) = F(X_z + X_{c(z)} + X_{d(z)}) = F(N_z + M_{c(z)} + D_{d(z)}) \quad (8)$$

which is the same that in equations (1) and (2), above.
The error function is:

$$E = \sum_k \rho(Y_k(\text{left}) - L_k) + \sum_k \rho(Y_k(\text{right}) - R_k) \quad (9)$$

that is the summation of all the errors. From (8), it is evident that when E→0 while NN learning, the output of the hidden layer will correspond to the desired calculated images to be illuminated on the screens.
NN learning.

In the initial step, the weights Wij have random values. A back propagation method (BackProp) was used to teach the NN:

$$W_{ij}(new) = W_{ij}(old) - \alpha \frac{dE}{dW_{ij}}, \quad (10)$$

where α-is a velocity of the learning. The experiments show that an acceptable accuracy was obtained at 10–15 iterations according (10) learning, for some images the extremely low errors can be achieved in 100 iterations. The calculations show the strong dependence between the level of errors and the parameters of the optical scheme, such as the shape of the L and R images, the distance between the near and distant screens and the mask, and the viewer eye position.

For obtaining more stable solutions for small variations of the optical parameters, two alternative methods can be used.

The first method involves modification of the error function (9), by adding a regularization term:

$$E = \sum_k \rho(Y_k(\text{left}) - L_k) + \sum_k \rho(Y_k(\text{right}) - R_k) + \beta \frac{W_{ij}^2}{2} \quad (11)$$

where β-is a regularization parameter.

The second method involves randomly changing the position of the viewer eye by a small amount during the training of the NN. Both of these methods can be used for enlarging of the area of stereo viewing.

Training methods other than "BackProp" can also be used, for example, a conjugated gradients method:

$$W_{i,J}(t) = W_{i,J}(t-1) + \alpha(t) S_{i,J}(t-1), \quad (12)$$

$$S_{i,J}(t) = -G_{i,J}(t) + \frac{\|G_{i,J}(t)\|^2}{\|G_{i,J}(t-1)\|^2} S_{i,J}(t-1)$$

$$G_{i,J}(t) = \frac{dE}{dW_{i,J}}.$$

which is a variant of Fletcher-Reeves. This will accelerate the training procedure 5–10 times.

A typical system to employ the present invention consists of two 15" AM LCDs having a resolution of 1024×768 and a computer system on based on an Intel Pentium III-500 MHz processor for stereo image processing. The computer emulates the neural network for obtaining the calculated images that must be illuminated on the near and distant screens in order to obtain separated left-right images in predefined areas. The neural network emulates the optical scheme of display and the viewer's eye position in order to minimize the errors in the stereo image.

This technique improves the image quality in comparison with parallax barrier systems due to the total use of the cells of all the screens for the information transmission. The present system can also identify the number of the viewers as well as the positions of the right and left eyes of each viewer and perform the above-mentioned procedures to realize the techniques in accordance with the identified eye positions of all the viewers. Such a system makes it possible for several viewers to receive visual information with the perception of the stereoscopic effect simultaneously.

The signals corresponding to the transmissivity of the near and distant screens cells are input into the memory unit by means of the processing block following the set program. The next step is to identify the light signals that can be directed from the cells of all the screens towards the right and left eyes of at least one viewer. Then compare the identified light signals directed towards each eye to the corresponding areas of the set 2-D stereopair image of the relevant object.

For each cell of each screen, the error signal is identified between the identified light signal that can be directed towards the relevant eye and the identified relevant area of the stereo picture of the relevant object aspect that the same eye should see. Each received error signal is compared to the set threshold signal. If the error signal exceeds the set threshold signal, the mentioned program of the processing block control changes the signals corresponding to the screen cells. The above process is repeated until the error signal becomes lower than the set threshold signal or the set time period is up.

It is also possible to solve the calculations for the case of two (or more) different objects reconstructed in two (or more) different directions for two (or more) viewers. It must be mentioned specifically that all calculations can be performed in parallel; the DSP processors can be designed for this purpose.

The present invention can be used for multi-viewing display emulation. It has been shown that the number of aspects depends upon the information capacity of the image, such that present experiments allow up to 20 viewing zone images.

It should also be noted that the system of the present invention may also be used with multiple viewers observing imagery simultaneously. The system simply recognizes the individual viewers' positions (or sets specific viewing zones) and stages images appropriate for the multiple viewers.

To adapt a system that uses a set image viewing zone (or zones) so as to allow a viewer to move, a viewer position signal is input into the system. The algorithms used to determine SL and SR use variables for the optical geometry, and the viewer position signal is used to determine those variables. Also, the viewer position signal is used to determine which stereopair to display, based on the optical geometry calculation. Numerous known technologies can be used for generating the viewer position signal, including known head/eye tracking systems employed for virtual reality (VR) applications, such as, but not limited to, viewer mounted RF sensors, triangulated IR and ultrasound systems, and camera-based machine vision using video analysis of image data.

A system and method for the viewing of stereo imagery has now been shown. It will be apparent to those skilled in the art that other embodiments of the present invention are possible without departing from the scope of the invention as disclosed.

What is claimed is:

1. A method of displaying autostereographic images, comprising:

storing stereopair images;

determining at least one viewing area located in front of at least two transmissive electronic displays, said displays spaced one in front of another relative to said viewing area;

selecting one of said stored stereopair images;

processing said selected stereopair image to produce two calculated images, each of said two calculated images containing at least some right-eye image information and at least some left-eye image information, a first one of said calculated images being adapted for a front one of said two transmissive electronic displays and a second one of said two calculated images being adapted for a rear one of said transmissive electronic displays;

displaying each said calculated image on an appropriate transmissive electronic display, wherein each displayed calculated image acts as a mask for the other displayed calculated image; and backlighting said transmissive electronic displays to display a stereographic image visible in said at least one viewing area.

2. The method of claim 1, wherein processing for each said calculated image comprises iteratively:

estimating the light directed to each one of a viewer's eyes by calculating interim calculated images for each of said transmissive electronic displays, and then determining the light directed through each discrete pixel of said front transmissive electronic display;

comparing the estimated light for each pixel with the equivalent light from the selected one of said stereopair images to determine an error;

adjusting said interim calculated images to reduce said error; and accepting said interim calculated images as said calculated images once said error for each pixel is below a set limit.

3. The method of claim 2, wherein said processing of said selected stereopair image is performed by an artificial neural network.

4. The method of claim 1, wherein said at least one viewing area is determined by a calculation responsive to a sensed viewer position signal.

5. The method of claim 1, wherein said calculated images are processed according to a plurality of viewing zones in said viewing area.

6. The method of claim 1, further comprising selecting a plurality of said stored stereopair images for display to a plurality of viewing zones in said viewing area, and wherein said two calculated images are produced by processing said selected stereopair images.

7. The method of claim 1, further comprising positioning a mask between said transmissive electronic displays, said mask being adapted to suppress Moiré patterns.

8. The method claim 7, wherein said mask comprises a diffuser.

9. The method of claim 1, wherein said displays are selected from the group consisting of liquid crystal displays, gas plasma displays, and organic light emitting polymer displays.

10. The method of claim 1, wherein said selecting of said one of said stereopair images is performed according to said determined viewing area, and wherein movements of said selected viewing area impacts said selecting of said one of said stereopair images.

11. A system for displaying autostereographic images, comprising:

storage means containing a plurality of stored stereopair images;

at least two electronic displays;

at least one viewing area in front of said at least two transmissive electronic displays, said displays spaced one in front of another relative to said viewing area;

means for selecting one of said stored stereopair images;

means for processing said selected stereopair image to produce two calculated images, each of said two calculated images containing at least some right-eye image information and at least some left-eye image information, a first one of said calculated images being adapted for a front one of said two transmissive electronic displays and a second one of said two calculated images being adapted for a rear one of said transmissive electronic displays;

means for displaying each said calculated image on an appropriate transmissive electronic display, wherein each displayed calculated image acts as a mask for the other displayed calculated image; and means to backlight said transmissive electronic displays to display an autostereographic image visible in said at least one viewing area.

12. The system of claim 11, wherein said means for processing each said calculated image comprises iterative means to:

estimate the light directed to each one of a viewer's eyes by calculating interim calculated images for each of said transmissive electronic displays, and then determine the light directed through each discrete pixel of said front transmissive electronic display;

compare the estimated light for each pixel with the equivalent light from the selected ones of said stereopair images to determine an error;

adjust said interim calculated images to reduce said error; and accept said interim calculated images as said calculated images once said error for each pixel is below a set limit.

13. The system of claim 12, wherein said means for processing is an artificial neural network.

14. The system of claim 11, further comprising a viewer position sensor to determine at least one viewing area.

15. The system of claim 14, wherein said means for selecting said one of said stereopair images selects according to said determined viewing area, and wherein movements of said selected viewing area impacts said selecting of said one of said stereopair images.

16. The system of claim 11, wherein said means for processing is further adapted to process said calculated images such that they can be displayed to a plurality of viewing zones in said viewing area to create an autostereographic image visible in said viewing zones.

17. The system of claim 11, wherein said means for selecting is adapted to select a plurality of said stored stereopair images, and where said means for processing is further adapted to process said plurality of selected stereopair images to calculate said calculated images such that they can be displayed to a plurality of viewing zones in said viewing area to create a plurality of aspects of an autostereographic image visible in said viewing zones.

18. The system of claim 11, further comprising a mask positioned between said transmissive electronic displays, wherein said mask is adapted to suppress Moiré patterns.

19. The system of claim 18, wherein said mask is a diffuser.

20. The system of claim 11, wherein said displays are selected from the group consisting of liquid crystal displays, gas plasma displays, and organic light emitting polymer displays.

* * * * *